June 18, 1963  J. F. PROKOP  3,094,461
ANTIMICROBIAL AGENT M-259 AND METHOD OF PREPARATION
Filed July 10, 1961
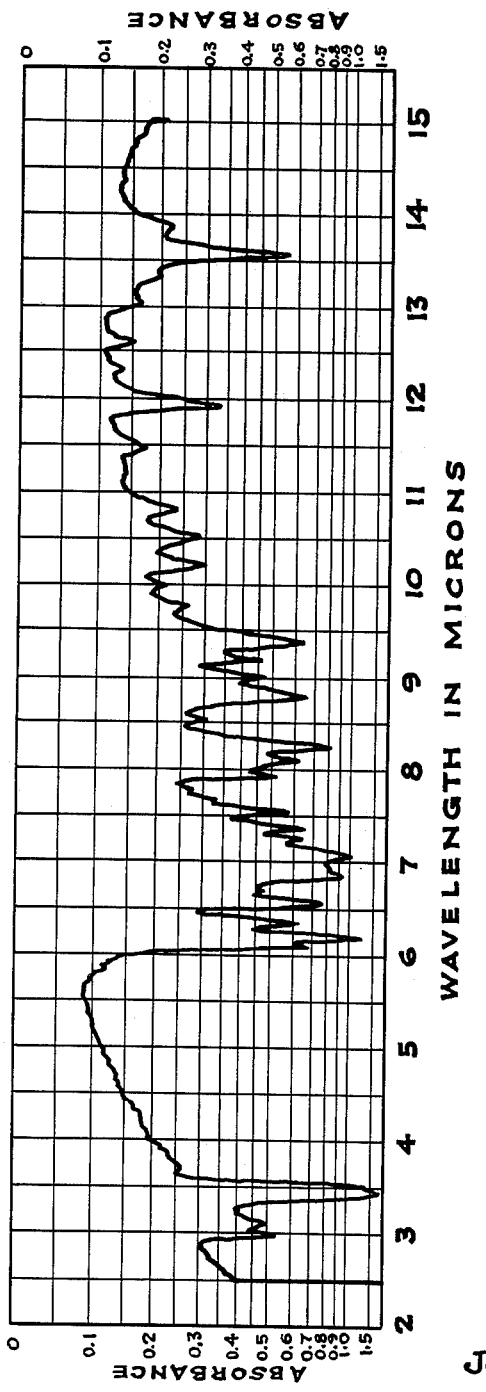
Inventor
Joseph F. Prokop
By Henry P. Stevens
Agent

United States Patent Office 3,094,461
Patented June 18, 1963

3,094,461
ANTIMICROBIAL AGENT M-259 AND METHOD OF PREPARATION
Joseph Frank Prokop, Mundelein, Ill., assignor to Abbott Laboratories, North Chicago, Ill., a corporation of Illinois
Filed July 10, 1961, Ser. No. 122,791
7 Claims. (Cl. 167—65)

This invention relates to a novel compound possessing antimicrobial properties and to a process for its preparation. More particularly, the invention relates to a novel composition of matter identified herein as antimicrobial agent M-259, to a process for its production by fermentation, to a method for its recovery and concentration from crude solutions including the fermentation broths and its purification.

It is one object of the present invention to provide a new and useful antimicrobial agent which is active against a variety of bacterial organisms, as for example, *Staphylococcus aureus*, *Streptococcus pyogenes* and *Diplococcus pneumoniae*. Another object is to provide a process for the production and recovery of M-259.

It has been found that by cultivating under controlled conditions and on suitable culture media a hitherto undescribed species of Streptomyces, a novel composition of matter herein identified as antimicrobial agent M-259 is obtained. The microorganism was isolated from a soil sample collected in Norwood, Massachusetts, and has been given the tentative classification of *Streptomyces nigellus*, sp. novo. A culture of the living organism has been deposited with the Culture Collection Unit of the Northern Utilization Research and Development Division, United States Department of Agriculture, Peoria, Illinois, under the code NRRL 2920. The taxonomy of this new organism follows.

With the exception of determining the cultural characteristics and proteolytic activity in gelatine which was done at 24° C., all cultural characteristics in the standard media listed below were obtained by incubation at 28° C.

The color code references, such as 1 ea, are in accordance with the Color Harmony Manual, third edition, Jacobsen, R.; Granville, W.C.; and Foss, C. E.; 1948; Container Corporation of America. The color names used are those designated in The ISCC-NBS Method of Designating Colors and a Dictionary of Color Names, U.S. Department of Commerce, National Bureau of Standards, Circular 553, issued November 1, 1955. As an example, the color of the removable plastic color chip coded 1 ea in The Color Harmony Manual is named light greenish yellow on page fifty-six of the NBS Circular 553. In the following table of cultural characteristics color names from The National Bureau of Standards Circular No. 553 are capitalized followed by the corresponding code of matching color chip from The Color Harmony Manual in parentheses. Other color observations are not capitalized.

CULTURAL CHARACTERISTICS OF *Streptomyces Nigellus*, Sp. Novo

| Medium | Day of incubation | Amount of growth | Gross morphology | Color of substratal (reverse) mycelium | Amount and color of aerial mycelium | Sporulation | Soluble pigment | Physiological changes |
|---|---|---|---|---|---|---|---|---|
| Waksman's agar | 14 | Good | Isolated colonies non-aerial, irregularly wrinkled to crateriform, spreading to 6.0 mm. diameter. Aerial mycelium only in areas of confluent growth. | Moderate Yellow (2 ic). | Sparse, Light Gray (b) to (c). | Scant | None | |
| Nutrient agar | 14 | Fair | Minute radial fissures on isolated colonies. | Dark Grayish Yellow (2 ie). | None | None | ...do..... | |
| Glucose agar | 14 | Good | Isolated colonies spreading, 4.0 mm., radially wrinkled with sparse aerial. Abundant aerial in areas of confluent growth. | Center of confluent growth area. Moderate Yellowish Brown (3 pi) edge of growth light Olive Brown (2 le). | Light Gray (c) in confluent growth area | Moderate | ...do..... | |
| Carvajal's oatmeal agar. | 14 | ...do..... | Isolated colonies 4.0 mm. spreading over surface and into agar with aerial in 1.0 mm. central portion. Abundant aerial in areas of confluent growth. | Grayish Yellow (1½ ec). | Abundant, Medium Gray (g). | Heavy | ...do..... | |
| Czapek's solution with dextrose, agar. | 14 | ...do..... | Abundant clear exudate which upon drying, leaves imprint of droplets in matrix of aerial mycelium. | Center of confluent growth Pale Yellow ((1½ db), edge Light Greenish Yellow (1 ea). | Abundant, Light Gray (c) | Sparse to moderate. | ...do..... | |
| Dextrose, asparagine agar. | 14 | Moderate to good. | Isolated colonies convex to hemispherical with entire edges. | ...do..... | Abundant, White (a) to Light Gray (c). | Sparse | ...do..... | Clouding of agar occurs at 7 to 14 days, subsequently clearing by 25 days. |
| Yeast extract, malt extract agar. | 14 | Good | Isolated colonies 7.0 mm. with irregularly dentate edge. Moderate to abundant pinkish exudate imparting an off color to otherwise gray aerial in some areas of confluent growth. | Center of confluent growth Moderate Yellow (2 fb) to Light Olive (1ni), edge of growth Grayish Olive (1 lg) to Moderate Olive (2 lg). | Abundant, Medium Gray, (g). | Heavy | ...do..... | |

| Medium | Day of incubation | Amount of growth | Gross morphology | Color of substratal (reverse) mycelium | Amount and color of aerial mycelium | Sporulation | Soluble pigment | Physiological changes |
|---|---|---|---|---|---|---|---|---|
| Tomato paste, oatmeal agar. | 14 | ___do___ | Isolated colonies radially wrinkled. A clear exudate present by microscopic examination. | Grayish Yellow (2 gc). | Moderate, Light Gray (b). | Fair | ___do___ | |
| Potato wedge | 14-25 | Moderate | Non-aerial growth Greenish Yellow (1½ ie) to Grayish Greenish Yellow (1½ gc) | | None | | ___do___ | |
| Calcium malate agar. | 7-14 | Moderate to good. | Isolated colonies low convex with feathery extension of growth into agar. | Grayish Yellow (1½ ec). | Abundant, Light Gray (c). | Moderate | ___do___ | Marked digestion of calcium malate dumbbell shaped accretions microscopically visible in cleared areas which again become somewhat cloudy upon longer incubation. |
| Tryptose blood agar. | 14 | Poor | Flat, thin, moist growth. | | None | | | Hemolysis good. |
| Inorganic salts, soluble starch agar. | 14 | Moderate | Isolated colonies roughly crateriform with 1.5 mm. raised central portion in colonies of 3.0 mm. diameter. | Center confluent growth area Moderate Yellowish Brown (3 lg), edge Grayish Yellow (2 gc). | Moderate, Olive Gray (2 ih) at center of confluent growth. Abundant, Medium Gray (g) at edge. | Moderate to good. | None | Hydrolysis negative to iodine test through 21 days. |
| Nitrate agar | 7-19 | Good after slow start. | | Moderate, Greenish Yellow (1½ gc) to Light Yellow (2 ea). | Sparse, White (A) | | ___do___ | Test for nitrite negative 7, 10, 19 days. |
| Gelatin plug | 12 | Good | No pellicle, growth submerged in liquefied medium. | | | | ___do___ | Marked liquefaction. |
| Litmus milk | 14-25 | Moderate to good. | Ring of growth at surface and extending up sides of tube. | Upper portion of growth Moderate Reddish Brown (6 pg), lower portion Light Grayish Red (6 ge). | None | | ___do___ | Coagulation negative, peptonization negative. Reaction of milk below growth unchanged. |
| Pridham and Gottlieb's synthetic basal agar with single readily utilizable carbon sources especially fructose, sucrose, lactose, cellobiose and raffinose. | 14 | Good | Excellent growth of aerial mycelium and sporulation. Marked by gray spore mass turning black in areas covered with abundant clear exudate. | | Abundant, gray with blackish patches. | Heavy | | |

MORPHOLOGY OF SPORES AND SPORE BEARING HYPHAE

The following morphological characteristics were observed from heavily sporulating growth on Pridham and Gottlieb's synthetic basal medium with glycerol as the carbon source and confirmed an the same medium with mannose as the source of carbon. The observations are typical of the morphology on other synthetic as well as complex media supporting good sporulation.

Spore chains arise singly and in closely branching intervals from principal mycelial filaments and in sparse tufts from the ends of these filaments. They are in open loops, hooks, and primitive open coils which lack in uniformity in size and direction of coiling. Spore chains are short, commonly consisting of less than thirty spores. The individual spores are almost uniformly globose. By wet mounts in water at 1000× magnification the spores appeared to be flattened slightly at their juncture with adjacent spores. Diameters of the spores were 0.7 to 0.9 micron.

The globose morphology of individual spores was confirmed by electron miscroscopy. They were free of ridges, spines, or convolutions and the range in size measured from electron micrographs at 13,500 diameters was in essential agreement with measurements by light microscopy.

UTILIZATION [1] OF CARBON SOURCES BY *Streptomyces nigellus*

| | Source | Utilization | Rate of growth |
|---|---|---|---|
| Pentoses | Xylose | + | Moderate. |
| | Arabinose | + | Rapid. |
| | Rhamnose | + | Do. |
| Hexoses | Dextrose | + | Do. |
| | Galactose | + | Do. |
| | Mannose | + | Do. |
| Ketoses | Fructose | + | Do. |
| | Sorbose | − | |
| Disaccharides | Sucrose | + | Do. |
| | Lactose | + | Do. |
| | Maltose | + | Moderate. |
| | Cellobiose | + | Rapid. |
| Trisaccharide | Raffinose | + | Do. |
| Polysaccharides | Soluble starch | + | |
| | Cellulose | − | |
| Glucoside | Salicin | + | Moderate. |
| Alcohols | Glycerol | + | Rapid. |
| | Mannitol | + | Do. |
| | Dulcitol | − | |
| | Inositol | + | Do. |
| | Sorbitol | − | |
| Acids | Sodium citrate | + | Slow. |
| | Sodium lactate | − | |
| | Sodium succinate | + | Moderate. |
| | Sodium acetate | + | Slow. |
| | Sodium potassium tartrate | + | Do. |
| Hydrocarbon | Paraffin | − | |
| Control | No carbon source | − | |

[1] Carbon sources added as sterile solutions to the basal agar medium of Pridham and Gottlieb, J. Bact., vol. 56; 107–114.

SUMMARY AND CLASSIFICATION

From a comparison with the species of Streptomyces as shown in Bergey's Manual of Determinative Bacteriology, Seventh Edition, 1957, Williams and Wilkins Company, Baltimore, Maryland; Actinomycetes and Their Antibiotics, Waksman, S. A., and Lechevalier, H. A., Williams and Wilkins Company, Baltimore, Maryland, 1953; A Guide for the Classification of Streptomyces According to Selected Groups, Pridham, T. G., Hesseltine, C. W., and Benedict, R. G., Applied Microbiology, vol. 6, No. 1, pp. 52–79, January 1958; Guide to the Identification of Bacteria and Actinomycetes, section pertaining to Actinomycetes, edited by Routien, J. B., Chas. Pfizer and Company, Inc., 1957, from Krassilnikov, N. A., Academy of Science, U.S.S.R., Moscow, 1949; and Problems in the Classification of Antagonistic Actinomycetes, Gauze, G. F., et al., English translation edited by David Gottlieb, 1959, published by American Institute of Biological Sciences, two species were selected as most closely resembling *Streptomyces nigellus*. These were *Streptomyces hygroscopicus*, var. *angustmyceticus*, and *Actinomyces* (*Streptomyces*) *nigrescens*. Both were selected for the property of gray aerial mycelium turning black particularly on synthetic medium as does *Streptomyces nigellus* and the general lack of production of soluble pigment, properties similar to *Streptomyces nigellus*.

*Actinomyces* (*Streptomyces*) *nigrescens*, sp. novo, Gauze, differs from *Streptomyces nigellus* in that all strains reported were strongly diastatic, and coagulated milk. The spore chains of *Actinomyces nigrescens* form regular spirals whereas those of *Streptomyces nigellus* exist as hooks, loops and primitive coils of irregular size and direction. Spores of *Actinomyces nigrescens* are oval whereas those of *Streptomyces nigellus* are uniformly globose. Of the two strains of seven of *Actinomyces nigrescens* which inverted sucrose, both were strongly diastatic and coagulated milk, as well as peptonized milk. *Streptomyces nigellus* is non-diastatic and does not peptonize or coagulate milk.

*Streptomyces hygroscopicus*, var. *angustmyceticus* is similar to *Streptomyces nigellus* among other features in its production of colorless exudate on synthetic medium, lack of soluble pigment production, a light yellow reverse color, and development of blackish areas in sporulating aerial. Its aerial is pale violet gray whereas that of *Streptomyces nigellus* is medium gray, lacking the violet color, a difference of questionable value.

It differs for *Streptomyces nigellus* in that its sporophores are spiral, is strongly diastatic, peptonizes milk, produces white cottony aerial on potato and fails to utilize arabinose, xylose, rhamnose and salicin and shows doubtful utilization of galactose and raffinose in the basal medium of Pridham and Gottlieb.

In view of the foregoing taxonomic criteria the name *Streptomyces nigellus*, sp. novo, was adopted. The specific epithet "nigellus" is Latin meaning "partially black" and aptly describes the characteristic appearance of the heavily sporulating aerial mycelium of *Streptomyces nigellus* upon continued incubation in synthetic medium with certain carbon sources.

GENERAL SPECIFICATIONS OF FERMENTATION PROCESS

The invention embraces a process for growing *Streptomyces nigellus* under controlled conditions which include a temperature range of 24° to 32° C., submerged fermentation with suitable agitation and aeration using media consisting of a carbon source such as glucose and soybean oil; a source of organic nitrogen such as soybean meal, corn steep liquor or peptone; mineral salts such as sodium chloride; an insoluble buffering agent to prevent the accumulation of acid such as calcium carbonate and a non-toxic defoaming agent such as methylpolysiloxane antifoam or polyglycol. When the growth of the organism has produced a satisfactory amount of M–259, normally three to six days depending upon the medium and the equipment used, a filtrate from the whole culture or the whole culture may be processed to recover the active material. The amount of active principle in the whole culture or filtrate may be determined by the ultraviolet absorption of a butanol extract. The antibiotic substance is more efficiently extracted from the whole culture than from the filtrate. The procedures involved are more fully described and illustrated in the examples. A specific substance thus obtained, possesses unique and valuable properties. It possesses characteristics which distinguish it from known and previously described antimicrobial substances.

Inoculum suitable for use in shaken flasks can be obtained by using the growth from tryptone agar slants. This medium can also be used to maintain by transfer from slant to slant suitable viable cultures which produce the antimicrobial agent. However, in practice, the maintenance of the *Streptomyces nigellus* culture in soil or under lyophilization is a more dependable procedure. The growth on slants is used to inoculate shaken flasks which in turn may be used to inoculate research-scale fermentors. An alternate procedure is to use the shaken flasks to inoculate suitable aluminum vessels containing an appropriate medium which after a period of growth are used to inoculate 200 liter fermentors. In general, the growth of the organism reaches its maximum in three to six days depending upon the medium, the size of the vessel and the conditions of incubation. For purposes of producing inoculum the incubation may be shortened to 48 hours. Aerobic conditions are maintained in Erlenmeyer flasks by vigorous agitation on a rotary shaking machine. Aerobic conditions are maintained in fermentors by forcing sterile air through a dispensing device at the bottom of the fermentor. This together with the agitation provided by a mechanical stirring device provides sufficient oxygen to the culture to allow satisfactory growth and production of the antimicrobial agent. The rate at which the air is forced into the culture medium is dependent somewhat upon the size and shape of the fermentation vessel. An aeration rate of ⅘ volume to one volume of air per volume of culture per minute is satisfactory. If foaming of the culture medium during fermentation becomes a problem, non-toxic antifoam agents may be added in sufficient quantity to dispel the foam. The culture medium is agitated throughout the fermentation period. However, in one phase of inoculum preparation where the yield of antimicrobial agent in the inoculum is not of major importance, sufficient agitation is achieved by bubbling air through the liquid. In contrast, when the yield of antimicrobial agent is important, agitation is accomplished by stirring devices which are part of the fermentation units. The degree of agitation is dependent upon the varied sized fermentation vessels since it is well understood that pilot sized fermentation tanks are designed for general usage rather than for a specific fermentation process. The organism *Streptomyces nigellus* is able to produce the desired antimicrobial agent in satisfactory amounts in a variety of culture media, over a temperature range of at least 24 to 32° C. and it is apparently not necessary to maintain an exact aeration rate or a precise amount of mechanical agitation.

GENERAL SPECIFICATIONS OF THE RECOVERY PROCESS

The production of M–259 during the fermentation is followed by periodic sampling of the whole culture. The sample is extracted with normal butanol and the optical density of the butanol solution is measured at 335 millimicrons.

After several days of fermentation, when the ultraviolet light absorption assay shows that the culture has produced a satisfactory amount of M–259 it is recovered by extracting the whole culture with butanol. Other solvents may be used, and chloroform in particular is an efficient extracting solvent. The efficiency of the extraction is not appreciably affected by pH, so it is convenient to perform the extraction without adjusting the pH, which at harvest is usually slightly above 7.

A crude solid preparation may be obtained by evaporating the solvent phase after separating it from the spent beer but when butanol is the extracting solvent, it is convenient to proceed with the next stage of purification after distilling off most of the butanol at reduced pressure. Depending on the amount and type of solids present in the concentrated butanol solution, the latter may be diluted with up to five times its volume of inert, non-polar solvent such as pentane or hexane to precipitate impurities without precipitating too much of the desired product. The optical density at 335 millimicrons is followed in order to avoid excessive precipitation of M-259.

The clarified butanol-hydrocarbon solution containing M-259 may be evaporated to obtain a crude solid preparation, but a better preparation is obtained by adsorbing the product on activated magnesium silicate and eluting it selectively. This process is done conveniently on a chromatographic column, passing the butanol-hydrocarbon solution over the absorbent in the column, washing the column with hydrocarbon and developing and eluting with a mixture of hydrocarbon and a more polar solvent such as methanol, ethanol or acetone. Acetone is preferred because it leaves some impurities on the adsorbent which are eluted when alcohols are used. The eluate from the column is collected in fractions and examined for absorption of ultraviolet light. The best fractions have absorption spectra approaching that of the pure crystalline product, i.e., a strong maximum at 335 millimicrons, a weaker maximum at 235 millimicrons and minima at 225 and 270 millimicrons. The active fractions are combined and evaporated to dryness. The M-259 is crystallized from acetone-ethyl acetate or acetone-benzene or other suitable solvent. The crystallization is a slow process. It is preferable to concentrate an acetone solution to the saturation point, seed it with crystals of M-259 and continue slow evaporation, adding the second solvent to complete the crystallization.

The following examples illustrate the formation, recovery, concentration, purification and identification of antimicrobial agent M-259 but are not intended to limit the invention to the precise techniques employed therein.

*Example 1.—Production in 27 Liter Fermentors With a Soybean Meal-Glucose Medium*

To a 500 milliliter Erlenmeyer flask is added 150 milliliters of a seed medium containing the following ingredients in the concentrations given.

| | Grams per liter |
|---|---|
| Glucose monohydrate | 15 |
| Soya-fluff flour (finely ground defatted soybean meal) | 15 |
| Sodium chloride | 5 |
| Calcium carbonate | 1 |
| Tap water to one liter. | |

The flask and its contents are sterilized by autoclaving for a period of 25 to 30 minutes at a temperature of 120° C. After cooling, the flask is inoculated with a section from the surface of a tryptone agar slant on which *Streptomyces nigellus* has been growing for at least five days. The inoculated flask is agitated at 28° C. on a rotary shaker having a stroke of two and one quarter inches and operating at about 240 r.p.m. for a period of 48 hours. A second passage seed is prepared by using the above culture to inoculate additional flasks prepared and sterilized as above. Each flask is inoculated with about 3 ml. of the 48 hour culture. The seed flasks are incubated and agitated as above for 48 hours.

To a small fermentor of 27 liter capacity is added 12 liters of a medium constituted as follows:

| | Grams per liter |
|---|---|
| Glucose monohydrate | 10 |
| Defatted soybean meal | 10 |
| Sodium chloride | 5 |
| Calcium carbonate | 1 |
| Antifoam oil | 5 |
| Tap water to one liter. | |

The fermentor and its contents are sterilized by autoclaving for 75 minutes at 121° C. After cooling, the fermentor is inoculated aseptically with the contents of three of the above described flasks of second passage seed culture. The culture is grown in the fermentor at 28° C. for three days during which time the broth is stirred mechanically and sterile air is passed into the bottom of the tank at the rate of about 0.8 volume of air per volume of broth per minute. During the fermentation, the pH rises to about 8.0. While maximum yields may occur after three days, in general, the 27 liter fermentors are harvested at three days. The presence of M-259 in the beer is indicated by extracting the filtered beer twice with a half volume of butanol, concentrating the butanol extract to about one-fiftieth volume, precipitating inactive material by adding 10 to 20 volumes of a mixed hexane solvent (sold as Skellysolve B) and measuring the activity of the Skellysolve B supernatant by taking an aliquot to dryness, dissolving the residue in a measured amount of n-butanol and measuring the optical density of the butanol solution at 335 millimicrons. An optical density unit has been defined as that amount of M-259 which in butanol solution will have an absorption maximum at 335 millimicrons with an optical density of 1.0. The measurement of this butanol solution demonstrates that the Skellysolve B supernatant contains 6.6 optical density units per ml.

*Example 2.—Production in 200 Liter Fermentors With a Soybean Meal, Glucose and Sodium Chloride Medium*

The organism, *Streptomyces nigellus* is grown on tryptone agar slants for 6 days at 28° C. The growth from an agar slant is suspended in a few milliliters of water and two 500 ml. Erlenmeyer flasks containing 150 ml. each of the following seed medium are inoculated.

| | Grams per liter |
|---|---|
| Soya-fluff flour (finely ground defatted soybean meal) | 15 |
| Glucose monohydrate | 15 |
| Sodium chloride | 5 |
| Calcium carbonate | 1 |

The flasks containing 150 ml. of this medium are sterilized by autoclaving for 30 minutes at 120° C. After cooling, the flasks are inoculated with the growth from the agar culture as described in Example 1. The inoculated flasks are agitated at 28° C. for 48 hours on a rotary shaker having an eccentric of 2¼ inches and operating at 240 r.p.m. The entire contents of these flasks are inoculated into a metal aerated bottle of approximately 12 liter capacity containing 10 liters of the following medium.

| | Grams per liter |
|---|---|
| Soybean meal | 15 |
| Glucose monohydrate | 15 |
| Sodium chloride | 5 |
| Calcium carbonate | 1 |
| Polypropyleneglycol antifoam | 1 |

The vessel and its contents are previously sterilized for 80 minutes at 120° C. and cooled to 28° C.

The aerated bottles are incubated at 28° C. for 48 hours. Air is bubbled through the culture medium from a tube at the bottom at the rate of approximately 10 liters per minute. The entire contents of the bottle are then used to inoculate a fermentor of 200 liter capacity containing 120 liters of the following medium which has been previously sterilized at 122° C. for 45 minutes and cooled to 28° C.

| | Grams per liter |
|---|---|
| Soybean meal | 10 |
| Glucose monohydrate | 10 |
| Sodium chloride | 5 |
| Calcium carbonate | 1 |
| Soybean oil | 5 |
| Methylpolysiloxane antifoam | 1 |

The inoculated medium in the fermentor is maintained under vigorous agitation at a temperature of 28° C. for 5 days. Sterile air for the purpose of aerating the medium is introduced at a rate of one volume per volume of medium per minute.

The harvested culture shows an assay of 4000 optical density units per liter when assayed in the manner described in Example 1.

*Example 3.—Production in 200 Liter Fermentors With Peptone, Corn Steep and Glucose Medium*

Sufficient inoculum for the two 200 liter fermentors is prepared as described in Example 2. The entire contents of each of two aerated bottles are used to inoculate two fermentors of 200 liters capacity containing 120 liters of the following medium which is previously sterilized at 122° C. for 45 minutes and cooled to 28° C.

| | Grams per liter |
|---|---|
| Peptone | 20 |
| Corn steep | 5 |
| Glucose monohydrate | 50 |
| Calcium carbonate | 2 |
| Soybean oil | 5 |
| Polypropyleneglycol antifoam | 1 |

The inoculated medium in the fermentors is maintained under vigorous agitation at a temperature of 28° C. for 6 days. Sterile air for the purpose of aerating the medium is introduced at the rate of one volume per volume of medium per minute.

The harvested culture of one fermentor showed an assay of 18,000 optical density units per liter and the second fermentor gave a value of 16,000 units per liter. The assay was carried out as described in Example 1.

*Example 4.—Recovery of M–259 From a 12 Liter Fermentation Using a Butanol Extraction Process*

The fermented liquor from a 27 liter fermentor prepared essentially as described in Example 1 is stirred with a commercially available diatomaceous filter aid sold under the trade name of Hyflo Super-Cel and separated by suction filtration to yield a clear filtrate. The latter is extracted twice with n-butanol, using one-half volume of butanol for each extraction. After each extraction, the mixture is allowed to stand until the phases separate and the butanol phase is drawn off. The two portions of butanol are combined and concentrated at reduced temperature under vacuum to about one-fiftieth volume and the concentrate is precipitated with twenty volumes of a mixed hexane solvent (commercially sold under the trade name Skellysolve B). The inactive precipitate is discarded and the Skellysolve B supernatant containing the activity is retained for further study.

One-half liter of the Skellysolve B supernatant is passed over a column of a synthetic magnesium silicate adsorbant (sold under the trade name of Florisil) approximately 55 centimeters long and 2.2 centimeters in diameter. The column is then washed with 1 liter of Skellysolve B, followed by development with 500 ml. of a 50% Skellysolve B–50% acetone solution, 500 ml. of a 25% Skellysolve B–75% acetone solution, 500 ml. of acetone, 500 ml. of a 50% acetone–50% methanol solution and finally 500 ml. of methanol. Activity of each 250 ml. of effluent is measured by optical density at 335 millimicrons. All the activity is found in the second 250 ml. fraction of the 50% Skellysolve B–50% acetone effluent and in the two 250 ml. fractions of the 25% Skellysolve B–75% acetone effluent which assayed 7.6 and 5.8 optical density units per ml., respectively.

*Example 5.—Recovery of M–259 From a 120 Liter Fermentation*

The whole culture, 107 liters, produced in Example 2 is extracted three times at the harvest pH of 8.5 with 20 liters of n-butyl alcohol. The solvent is separated by centrifugation and the three extracts combined to yield 52 liters of butanol solution. This solution is concentrated under vacuum. The volume is reduced to approximately 14 liters at which point the solution becomes opaque as solids begin to separate. During the evaporation process, the temperature is maintained below 31° C.

The butanol concentrate which assays 36 optical density units per ml. is further concentrated under vacuum to one tenth volume and then clarified by centrifugation and filtration through brilliant asbestos. The clarified butanol solution measuring 1520 ml. contains a total of 466,000 optical density units of active material. This butanol solution is mixed with 4¼ volumes of pentane to precipitate inactive solids. The clarified supernatant solution of butanol and pentane contains 420,945 optical density units.

A column is prepared by slurrying sufficient magnesium silicate in a mixture of one part butanol and five parts of pentane to give a 700 ml. bed. The column is 33 mm. in diameter and 96.5 cm. in length. The butanol-pentane solution is passed over the magnesium silicate at a flow rate of 10 to 15 ml. per minute. The column is washed with pentane and then eluted with a mixture of equal parts of pentane and acetone.

The fractions of the eluate which contain the bulk of the activity are combined and concentrated to dryness under vacuum on a rotary evaporator. The residue is dissolved in absolute ethyl alcohol which has previously been adjusted to pH 2.0 with hydrochloric acid. Two volumes of benzene are added and the solution is evaporated to a syrup on a rotary evaporator. This syrup is dissolved in a mixture of two parts benzene and one part acetone. After seeding with a few crystals of M–259, slow evaporation at room temperature initiates crystallization. When crystallization is complete, the crystals are separated and washed with benzene. On drying 1.346 grams of crystals are obtained and they are found to contain 75 optical density units of active material per mg.

The crystals are dissolved in absolute ethyl alcohol at pH 2.0 with hydrochloric acid and recrystallized from a mixture of benzene and acetone. The final yield of recrystallized M–259 is 774 mg. which has a potency of 79 optical density units per mg.

*Example 6.—Recovery of M–259 by Butanol Extraction and Chromatography*

One hundred and seventy-three liters of whole culture at pH 7.2, produced in two fermentors as described in Example 3, is mixed with 85 liters of n-butyl alcohol and stirred for thirty minutes. The solvent is separated on a centrifuge to give 67 liters of extract. A second extraction is carried out with 57 liters of butanol. The mixture of solvent and whole culture is stirred for fifteen minutes. The butanol phase is separated by the centrifugation and combined with the first extract to give 135 liters. Ten liters of water at 80° F. is added to the butanol extract with gentle stirring. Following centrifugation, 130 liters of butanol extract is recovered. This solution which assays 26 optical density units per ml. is concentrated under vacuum to 8,750 ml. During the evarporation process the temperature is maintained below 30° C.

The butanol concentrate is clarified with a centrifuge and further concentrated under vacuum to 3700 ml. The volume is adjusted to 4000 ml. by adding butanol. This solution contains approximately 3,013,500 optical density units of active material. Inactive solids are precipitated by adding five volumes of pentane. The supernatent butanol and pentane solution is separated by centrifugation. Since this butanol-pentane solution contains only 85 percent of the active substance, the residue is dissolved in 1130 ml. of butanol. Inactive material is precipitated by adding five volumes of pentane. The mixed solvents contain at this point six percent of the original activity and are combined with the more concentrated butanol-pentane solution.

A column is prepared by slurrying sufficient magnesium silicate in a mixture of one part butanol and five parts of pentane to yield a 3000 ml. bed. The column is 50 mm. in diameter and 150 cm. in length. The butanol-pentane solution is passed through the column. The column is washed with pentane and then eluted with acetone. The fractions of the eluate which contain the bulk of the activity are combined and concentrated to remove the acetone. The butanol solution (2000 ml.) has an assay of 1149 optical density units per ml. Inactive solids are precipitated by the addition of five volumes of pentane.

A column of silica gel is prepared by suspending a sufficient quantity of silica gel in one part of butanol and five parts of pentane to give a volume of 2500 ml. after the solids are settled. The silica gel is placed in a column 50 mm. in diameter and the depth of the bed is 120 cm. The butanol-pentane solution is passed through the silica gel at a flow rate of 50 to 70 ml. per minute. The column is washed with pentane and then with a mixture of three parts pentane and one part acetone. Elution is accomplished with acetone.

The fractions of the eluate representing nearly all the active material are combined and concentrated under vaccum to a syrup. The syrup is dissolved in acetone and again concentrated until crystallization begins. Crystallization is allowed to proceed slowly and finally is promoted by the addition of ethyl acetate and slow evaporation. The crystalline product is collected by filtration, washed with ethyl acetate, and dried under vacuum at room temperature. The crystals weigh 6.035 grams and assay 92 optical density units per mg.

*Example 7.—Purification of M–259 by Silica Gel Chromatography*

A total of 2700 ml. of butanol extract assaying 440 optical density units per ml. is prepared essentially as described in Example 6. The active material is produced in 200-liter fermentors as described in Example 2. A butanol solution of partially purified M–259 from several earlier preparations is prepared containing 659,000 optical density units. The two butanol solutions are combined to provide the starting material for this example.

The combined butanol solutions are mixed with five volumes of pentane to precipitate inactive material. The recovered butanol and pentane supernatant solution has a volume of 9,800 ml. and contains 882,000 optical density units of the active material.

A column of silica gel is prepared by suspending a sufficient quantity of silica gel in one part butanol and five parts pentane to give a volume of 100 ml. after the solids are settled. The silica gel is placed in a column 12 mm. in diameter and the depth of the bed is 76 cm. Nine hundred ml. of the above solution is passed over the silica gel column at a flow rate of 8 to 10 ml. per minute. The column is washed with pentane and then with a solution containing three parts pentane and one part acetone. The column is eluted with a solution containing equal parts of acetone and pentane followed by acetone.

The more potent fractions of the eluate, which contain 67,400 optical density units, are combined and concentrated to dryness on a rotary evaporator under vacuum at room temperature. The residue is dissolved in acetone. Ethyl acetate is added and the solvents slowly removed to promote crystallization of the M–259. When crystallization is complete, the crystals are collected by filtration and washed with ethyl acetate. The crystals after drying at room temperature weighed 455 milligrams. Assays by ultraviolet absorption gave a potency of 105 optical density units per mg.

INFRARED ABSORPTION SPECTRUM FOR ANTIMICROBIAL AGENT M–259

When an infrared spectrum of antimicrobial agent M–259 is run as a Nujol mull, using a double beam spectrophotometer, the following absorption bands are seen:

| Wavelength in microns | Frequency in reciprocal cm. | Intensity [1] |
|---|---|---|
| 2.97 | 3,367 | W |
| 3.10 | 3,226 | W |
| 3.45 | 2,899 | Nujol |
| 6.10 | 1,639 | M |
| 6.19 | 1,616 | S |
| 6.35 | 1,575 | M |
| 6.65 | 1,504 | M |
| 6.85 | 1,460 | Nujol |
| 7.08 | 1,412 | S |
| 7.27 | 1,376 | Nujol |
| 7.35 | 1,361 | M |
| 7.55 | 1,325 | M |
| 7.93 | 1,261 | M |
| 8.10 | 1,235 | M |
| 8.25 | 1,212 | S |
| 8.53 | 1,172 | W |
| 8.81 | 1,135 | M |
| 9.00 | 1,111 | M |
| 9.20 | 1,087 | M |
| 9.38 | 1,066 | M |
| 9.75 | 1,026 | W |
| 9.99 | 1,001 | W |
| 10.20 | 980 | M |
| 10.52 | 950 | M |
| 10.80 | 926 | W |
| 11.45 | 873 | W |
| 11.93 | 838 | M |
| 12.30 | 813 | W |
| 12.60 | 794 | W |
| 13.03 | 767 | W |
| 13.35 | 749 | W |
| 13.57 | 737 | S |
| 13.88 | 720 | Nujol |

[1] S=Strong; M=Medium; W=Weak.

The X-ray diffraction powder pattern for crystalline M–259 was obtained on photographic film using nickel filtered $CuK_\alpha$ radiation ($\lambda=1.5418$ A.) with a standard General Electric powder camera of 7.16 cm. radius which permitted detection of $d$-spacings up to 20 A. The relative intensities of the diffraction lines were estimated visually. The $d$-spacings and intensities were as shown in the following table.

X-RAY DIFFRACTION PATTERN OF ANTIMICROBIAL AGENT M–259

| $d$-Spacing in angstroms | Estimated relative intensity |
|---|---|
| 10.2 | 9 |
| 6.5 | 6 |
| 5.7 | 7 |
| 5.15 | 8 |
| 4.72 | 5 |
| 4.50 | 1 |
| 4.20 | 9 |
| 3.88 | 10 |
| 3.70 | 1 |
| 3.37 | 6 |
| 3.25 | 3 |
| 3.04 | 1 |
| 2.95 | 2 |
| 2.85 | [1] 4 |
| 2.63 | 2 |
| 2.56 | 1 |
| 2.47 | 1 |
| 2.23 | 2 |
| 2.12 | 3 |
| 1.97 | [1] 1 |
| 1.90 | 1 |
| 1.78 | [1] 1 |

[1] Broad.

ANTIMICROBIAL SPECTRUM OF M-259
ALGAE

| Organism | Minimum inhibitory concentration, mcg./ml. |
|---|---|
| Chlorella pyrenoidosa | 100 |

BACTERIA

| | |
|---|---|
| Bacillus subtilis | 12.5 |
| Corynebacterium species | 6.2 |
| Diplococcus pneumoniae | 6.2 |
| Escherichia coli | 500 |
| Klebsiella pneumoniae | 125 |
| Proteus vulgaris | 500 |
| Sarcina lutea | 50 |
| Staphylococcus epidermitis | 12.5 |
| Staph. aureus, 209 P | 6.2 |
| Staph. aureus, Smith | 3.1 |
| Streptococcus faecalis | 18.7 |
| Streptococcus pyogenes | 6.2 |

FUNGI

| | |
|---|---|
| Aspergillus niger | 500 |
| Aspergillus versicolor | 500 |
| Alternaria species | 100 |
| Chaetomium globosum | 100 |
| Fusarium oxysporum | 500 |
| Myrothecium verrucaria | 500 |
| Penicillium citrinum | 500 |

PROTOZOA

| | |
|---|---|
| Endamoeba histolytica | 1 |
| Trichomonas foetus | 0.39 |
| T. vaginalis | 0.39 |

YEAST

| | |
|---|---|
| Candida albicans | 500 |

M-259 crystallizes from an acetone-ethyl acetate mixture in the form of yellow triangular prisms which melt at 155°–157° C. with decomposition. Upon analysis, M-259 is found to contain 63.00% carbon, 6.43% hydrogen, 18.42% oxygen and 11.95% nitrogen. The molecular weight as determined by the sedimentation velocity-diffusion method is 795±60. When one milligram of M-259 is dissolved in one milliliter of absolute ethanol, the resulting solution has a specific rotation of $$\alpha_D^{25} = +0.90$$

The compound gives negative results in the acrolein, ninhydrin, phosphate and biuret tests. It does not react with reducing agents, is hydrolyzed in acid solutions and appears to be non-dialyzable. The maximum solubility of M-259 in various solvents at room temperature is as follows.

Solvent: Mg./ml.
- Water ---- 0.1
- Acetone ---- 1.0
- Saturated hydrocarbons ---- 1.0
- Benzene ---- 1.0
- Ethyl acetate ---- 1.0
- Butanol ---- 1.0
- Ethanol (absolute) ---- 2.0
- Acidified absolute ethanol ---- 50.0
- Methanol ---- 4.0
- Dimethylformamide ---- 15.0
- Dimethylsulfoxide ---- 65.0
- Chloroform ---- 60.0

The ultra-violet absorption spectrum of an ethanol solution of M-259 exhibits maxima at 235 and 335 millimicrons with extinction coefficients $$E_{1\,cm.}^{1\%}$$

of 480 and 960, respectively. Minimum absorption occurs at 225 and 270 millimicrons.

Antimicrobial agent M-259 is useful for the control of the growth of a variety of bacterial organisms. In such use, it can be dispersed on an inert, finely divided solid and employed as a dust. If desired, it can be dispersed in water and employed as a spray. The product can also be employed as a constituent of oil and water emulsions with or without a wetting, dispersing or emulsifying agent. In representative operations, M-259 gave complete inhibition of the growth of Staphylococcus aureus when employed as an aqueous composition containing 50 parts by weight of said compound per million parts by weight of ultimate mixture.

In addition, M-259 has been found to be a very effective post-emergence herbicide when dispersed in water and applied as an aqueous spray. In actual tests, M-259 when sprayed on growing oats and mustard at the rate of 10 pounds per acre resulted in kills of 40 and 90%, respectively.

What is claimed is:
1. A method of producing an antimicrobial substance designated as antimicrobial agent M-259 which comprises cultivating the organism Streptomyces nigellus under submerged aerobic conditions in a culture medium containing assimilable sources of carbohydrates, organic nitrogen and inorganic salts until substantial antimicrobial activity is produced by said organism in said culture medium.

2. A method of producing an antimicrobial substance designated as antimicrobial agent M-259 which comprises cultivating the organism Streptomyces nigellus under submerged aerobic conditions in a culture medium containing assimilable sources of carbohydrates, organic nitrogen and inorganic salts until substantial antimicrobial activity is produced by said organism in said culture medium and recovering the antimicrobial agent M-259 from said culture medium.

3. A method as claimed in claim 2 in which the organism is Streptomyces nigellus NRRL 2920.

4. A method as claimed in claim 2 in which the culture medium is maintained at a temperature between about 24° C. and about 32° C. and the growth of the organism is carried out for a period of from 3 to 6 days.

5. A method as claimed in claim 2 which includes the step of extracting the culture broth at a pH of not less than 7 with a water-immiscible, polar, organic solvent.

6. A method as claimed in claim 5 in which the organic solvent employed is butanol.

7. An antimicrobial substance designated as antimicrobial agent M-259 which in its free base form has the following properties: substantially insoluble in water, somewhat soluble in acetone, saturated hydrocarbons, benzene, ethyl acetate, butanol, ethanol and methanol but readily soluble in dimethylformamide, chloroform, dimethylsulfoxide and acidified absolute ethanol; an ultra-violet absorption spectrum in ethanol exhibiting maxima at 235 and 335 millimicrons; an infrared absorption spectrum when run in a Nujol mull as shown in the drawing; has X-ray diffraction lines expressed in angstroms at 10.2, 6.5, 5.7, 5.15, 4.72, 4.50, 4.20, 3.88, 3.70, 3.37, 3.25, 3.04, 2.95, 2.85, 2.63, 2.56, 2.47, 2.23, 2.12, 1.97, 1.90 and 1.78; an elemental analysis of 63.00% carbon, 6.43% hydrogen, 18.42% oxygen and 11.95% nitrogen; a molecular weight as determined by the sedimentation velocity-diffusion method of 795±60; a specific rotation in ethanol solution of $\alpha_D^{25} = +0.90$; a melting point of 155°–157° C. with decomposition, is non-dialyzable and gives negative results in the acrolein, ninhydrin, phosphate and biuret tests.

References Cited in the file of this patent

De Somer: Antibiotics and Chemotherapy, 1955, pp. 632–639.

Charney: Antibiotics and Chemotherapy, 1957, pp. 606–614.